(12) United States Patent
Warkentin et al.

(10) Patent No.: US 9,465,617 B1
(45) Date of Patent: Oct. 11, 2016

(54) IMPLEMENTING UPCALL FROM SECURE TO NON-SECURE MODE BY INJECTING EXCEPTION INTO NON-SECURE MODE

(71) Applicant: VMware, Inc., Palo Alto, CA (US)

(72) Inventors: Andrei Warkentin, Wakefield, MA (US); Harvey Tuch, Cambridge, MA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/753,720

(22) Filed: Jun. 29, 2015

(51) Int. Cl.
| | |
|---|---|
| *G06F 9/48* | (2006.01) |
| *G06F 9/38* | (2006.01) |
| *G06F 13/26* | (2006.01) |
| *G06F 9/30* | (2006.01) |
| G06F 9/46 | (2006.01) |
| G06F 9/54 | (2006.01) |
| G06F 9/455 | (2006.01) |

(52) U.S. Cl.
CPC .......... *G06F 9/3865* (2013.01); *G06F 9/30145* (2013.01); *G06F 13/26* (2013.01); *G06F 9/45533* (2013.01); *G06F 9/45558* (2013.01); *G06F 9/461* (2013.01); *G06F 9/4812* (2013.01); *G06F 9/545* (2013.01)

(58) Field of Classification Search
None
See application file for complete search history.

(56) References Cited

U.S. PATENT DOCUMENTS

| | | | |
|---|---|---|---|
| 6,799,236 B1 * | 9/2004 | Dice | G06F 9/52 710/200 |
| 7,178,062 B1 * | 2/2007 | Dice | G06F 9/524 710/260 |
| 2004/0187117 A1 * | 9/2004 | Orion | G06F 9/4812 718/100 |
| 2006/0259675 A1 * | 11/2006 | Talluri | G06F 13/24 710/260 |
| 2009/0055571 A1 * | 2/2009 | Budko | G06F 21/53 711/6 |
| 2009/0172329 A1 * | 7/2009 | Paver | G06F 12/1491 711/163 |
| 2009/0172713 A1 * | 7/2009 | Kim | G06F 9/30145 719/331 |
| 2010/0229173 A1 * | 9/2010 | Subrahmanyam .. | G06F 9/45533 718/103 |
| 2011/0296411 A1 * | 12/2011 | Tang | G06F 9/45545 718/1 |
| 2012/0079254 A1 * | 3/2012 | Williams | G06F 11/3648 712/227 |
| 2014/0149781 A1 * | 5/2014 | Horman | G06F 9/545 714/2 |
| 2014/0351472 A1 * | 11/2014 | Jebson et al. | G06F 13/24 710/269 |
| 2015/0212867 A1 * | 7/2015 | Klee | G06F 9/50 710/5 |

* cited by examiner

Primary Examiner — Benjamin Wu

(57) ABSTRACT

A computer system that does not natively support non-maskable interrupts (NMIs) implements NMI-like functionality in a secure monitor. The computer system detects a high priority interrupt and determines whether or not interrupts are enabled or disabled. If interrupts are enabled, the computer system injects an exception into a currently executing thread of system software operating at the second privilege level, and an exception handler processes the exception like a standard exception. If interrupts are disabled, the computer system saves the current system state (e.g., the current program counter and CPU state) and values of one or more exception handling registers in temporary storage and injects an exception into the currently executing thread of the system software, and the exception handler processes the exception in a special manner.

20 Claims, 3 Drawing Sheets

IMPLEMENTING UPCALL FROM SECURE TO NON-SECURE MODE BY INJECTING EXCEPTION INTO NON-SECURE MODE

BACKGROUND

The ARM® 64-bit processor systems are operable at multiple hierarchical privilege levels. Typically, such systems execute user applications at a lowest privilege level, known as exception level 0 (EL0), and execute system code at three increasingly higher privilege levels, known as EL1, EL2, and EL3. For example, operating system code may execute at EL1, hypervisor code for supporting virtual machines at EL2, and secure monitor code at EL3.

In processor architectures, such as the x86 architecture, non-maskable interrupts (NMIs) are supported. Generally, NMIs are high priority interrupts that cannot be ignored by system software, such as an operating system or hypervisor, even if other interrupts or exceptions are being ignored (or masked). Additionally, NMIs generally take priority over regular device interrupts. Non-maskable interrupts may be used, for example, to report system errors, for deadlock protection, to request performance of an action on short notice, and to implement other watchdog functionality.

Some processor architectures, such as the ARM64® architecture, do not support non-maskable interrupts. Porting a hypervisor or an operating system from an architecture that supports NMIs to an architecture that does not support NMIs may present challenges in implementing functionality based on NMIs (e.g., deadlock detection or performance counter overflows).

SUMMARY

One or more embodiments implement NMI-like functionality in computer systems that do not natively support NMIs. According to embodiments, a computer system operates at multiple privilege levels, including a first privilege level and a second privilege level that is lower than the first privilege level. Within the computer system, high priority and standard priority interrupts are generated. In one embodiment, the computer system detects a high priority interrupt and determines whether or not interrupts are enabled or disabled. If interrupts are enabled, the computer system injects an exception into a currently executing thread of system software operating at the second privilege level. If interrupts are disabled, the computer system saves the current system state (e.g., the current program counter and CPU state) and values of one or more exception handling registers in temporary storage and injects an exception into the currently executing thread of the system software.

In the embodiments, NMI-like functionality may be introduced through injecting exceptions from a system operating at the first (higher) privilege level to a system operating at the second (lower) privilege level. In one example, the system operating at the first privilege level is a secure monitor or system firmware, and the system operating at the second privilege level is a hypervisor or a host operating system. In another example, the system operating at the first privilege level is a hypervisor, and the system operating at the second privilege level is a guest operating system. Advantageously, implementing NMI-like functionality through upcalls from a secure monitor/system firmware to a hypervisor or a host operating system (or from a hypervisor to a guest operating system) may allow for emulating NMIs in systems that do not natively support NMIs. Further, implementing NMI-like functionality through upcalls allows a secure monitor (or a hypervisor) operating at the first privilege level to monitor operations at the second privilege level for deadlocks or perform other watchdog functionality at the secure monitor.

DETAILED DESCRIPTION

Figure 1:
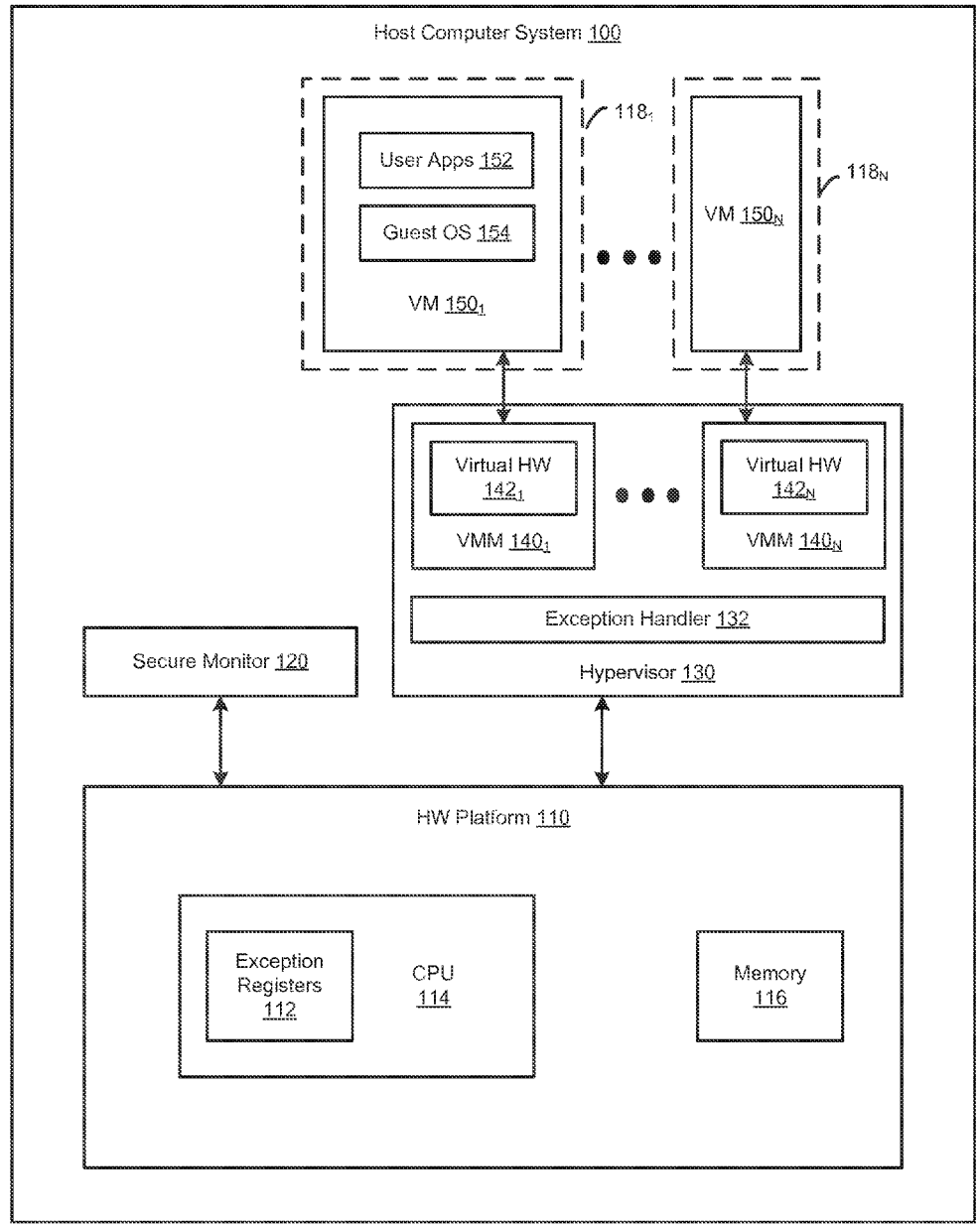
FIG. 1 is a block diagram of a virtualized host computer system that implements NMI-like functionality in a processor platform that does not support NMIs, according to one or more embodiments.

FIG. 1 is a block diagram of a host computer system 100 that is configured to implement NMI-like functionality in a processor platform, such as the ARM64® processor platform, that does not natively support NMIs, according to one or more embodiments. The implementation is described herein in the context of a virtualized computing system where the system software is a virtualization software layer, e.g. hypervisor 130, which supports execution of virtual computing instances, such as a virtual machine (VM). It should be recognized that other embodiments may be implemented in a computer system where the system software is an operating system.

Host computer system 100 may be constructed on a desktop, laptop, mobile, tablet, or server grade hardware platform 110. Hardware platform 110 includes one or more central processing units (CPU) 114, host physical memory 116, and other standard hardware components such as network interface controllers (not shown) that connect host computer system 100 to a network. Hypervisor 130 is also installed on top of hardware platform 110, and provides operating system functionality (e.g., process creation and control, file system, process threads, etc.) as well as CPU scheduling and memory scheduling across multiple virtual machine (VM) execution spaces $118_1$-$118_N$ within hypervisor 130. Within each VM execution space $118_1$-$118_N$, a VM process is executed to instantiate corresponding VMs $150_1$-$150_N$. Virtual machine monitors (VMM) $140_1$-$140_N$ implement the virtual system support needed to coordinate operations between hypervisor 130 and their respective VMs $150_1$-$150_N$.

As shown, each VMM $140_1$-$140_N$ manages a corresponding virtual hardware platform (i.e., virtual hardware platforms $142_1$-$142_N$) that includes emulated hardware such as virtual CPUs (vCPUs) and guest physical memory. Each virtual hardware platform 142 supports the installation of a guest operating system (OS) 154. In each instance, guest OS 154 provides user applications 152 running in the virtual machine an interface to the virtual hardware platform of the virtual machine.

In operation, CPU 114 executes software at different privilege levels, where each privilege level imposes a set of constraints and provides a set of functionality, such as access to specific registers and address translation mechanisms. In the embodiment illustrated in FIG. 1, hardware platform 110 supports four hierarchical privilege levels. From least to most privileged, the privilege levels are exception levels 0, 1, 2, and 3 (or EL0, EL1, EL2, and EL3). Hypervisor 130 executes at EL2; guest operating system 154 operating within virtual machine 150 executes at EL1, and user applications 152 execute at EL0. It should be understood, however, that hardware platforms of other embodiments may support a different number of hierarchical privilege levels. A secure monitor 120, which is one of the components implemented in host computer system 100 to provide NMI-like functionality according to embodiments, is executed at EL3.

When hardware platform 110 is powered on, platform firmware executes in "secure mode" (i.e., at the highest privilege level, EL3) and then transitions hardware platform 110 to a non-secure mode (a lower privilege level). As part of the power-on process, platform firmware performs various initialization functions, such as installing secure monitor 120 and hypervisor 130. In various embodiments, the functionality of platform firmware, and/or hypervisor 130 may be consolidated into a single unit or distributed into additional units.

As shown, secure monitor 120 is installed on top of hardware platform 110. CPU 114 executes secure monitor 120 at the highest privilege level (EL3). In general, secure monitors are implemented for security purposes to protect against computer viruses and the like, and to provide a trusted computing base, debugging facilities, etc. In the embodiments illustrated herein, the privilege level of secure monitor 120 is leveraged to inject exceptions into less privileged code, such as hypervisor 130, so that NMI-like functionality can be implemented in host computer system 100.

CPU 114 is shown to include exception registers 112 that are employed in the embodiments to implement NMI-like functionality. Exception registers 112 include CPU program state exception registers, return address registers, and exception syndrome registers. One of each of these registers is provided for each exception level. In the example of the ARM64® architecture, when the system software encounters an exception, the CPU state is saved in the Saved Program Status Register (SPSR), the return address in the Exception Link Register (ELR), and the syndrome information in the Exception Syndrome Register (ESR). After the system software finishes processing an exception, the system software employs a standard return from exception instruction (i.e., eret( )) to restore the CPU state from SPSR and the program counter from ELR and resume execution of code that was operating before the system software processed the exception.

Exception registers 112 also include an interrupt enabled/disabled register that stores information regarding whether interrupts are enabled or disabled. In alternative embodiments, the interrupt enabled/disabled information can be stored in fields of a CPU state register (e.g., the DAIF fields of the CPU state register in the ARM64® architecture). To mask or disable interrupts, the CPU sets a value in the interrupt enabled/disabled register to indicate that a particular interrupt has been disabled. For example, if the DAIF field is set to 0000, all interrupts are enabled. If one of the fields is set to a value of 1, interrupts corresponding to that field type are disabled. For example, if IRQ interrupts were to be disabled, system software would set the DAIF field of the CPU state register to 0010, which indicates that IRQ interrupts (I) are masked, but debug exceptions (D), asynchronous exceptions (A), and FIQ interrupts (F) are not masked.

As described in further detail below, when secure monitor 120 executes an upcall into the system software, secure monitor 120 reads the interrupt enabled/disabled register to determine if the system software has disabled any interrupts. Because the CPU disables interrupts at the beginning of an exception or interrupt, secure monitor 120 executes the upcall in one of two ways depending on whether or not the system software has disabled any interrupts. The two different techniques are described in further detail below.

According to embodiments, secure monitor 120 operating at exception level EL3 determines whether to execute an upcall to hypervisor 130 operating at exception level EL2 or a host operating system operating at exception level ELL Secure monitor 120 determines that an upcall is to be injected into hypervisor 130 based on, for example, whether the interrupt state was in exception level EL2, whether exceptions at EL1 are being routed to EL2 (i.e., the hypervisor configuration register (HCR) traps general exception flag, HCR_EL2.TGE, is set), whether interrupts are routed to EL2 (i.e., the HCR physical IRQ routing flag, HCR_EL2.IMO, is set), or whether asynchronous exceptions are routed to EL2 (i.e., the HCR asynchronous abort and error interrupt routing flag, HCR_EL2.AMO, is set). If exceptions or interrupts are routed to EL2 or the interrupt state is in exception level EL2, secure monitor 120 executes upcalls to hypervisor 130; otherwise, secure monitor 120 executes upcalls to an operating system operating at exception level EL1.

According to embodiments, secure monitor 120 executes upcalls to hypervisor 130 to inject an exception into the system software code in one of two ways. Prior to injecting the exception, secure monitor 120 determines whether the CPU has disabled interrupts by examining the interrupt enabled/disabled register (or, in alternative embodiments, the DAIF fields in the CPU state register). If secure monitor 120 determines that no fields in the interrupt enabled/disabled register have been masked, secure monitor 120 injects the exception into the system software by simulating actions that the CPU takes when an exception is delivered to a particular exception level, ELx, which may be EL1 or EL2 in the embodiments (hereinafter referred to as a "fast upcall"). When secure monitor 120 injects the exception into the system software, secure monitor 120 saves the ELR_EL3 and SPSR_EL3, which corresponds to the state prior to executing secure monitor 120, in exception registers 112 for exception level ELx. In the example of the ARM64® architecture, the program counter is stored in the ELR register for exception level ELx, and the CPU state is stored in the SPSR register for exception level ELx. Secure monitor 120 then sets the ELR and SPSR registers for exception level EL3 to values corresponding to the program counter and CPU state for handling an exception at exception level ELx. For example, the ELR for exception level EL3 may be set to the value of the vector base address register for exception level ELx plus an offset, and the SPSR for exception level EL3 may be set to indicate the exception level ELx and a stack register selector, and to indicate that interrupts are masked. Finally, the ESR for the exception level ELx is set to a value corresponding to the upcall, e.g., SMC. After the system software finishes processing the exception, the system software employs a standard return from exception instruction, eret( ) to restore the CPU state from the SPSR for the exception level ELx and the program counter from the ELR for the exception level ELx to resume execution of the code executing by the system software before secure monitor 120 took control and injected an upcall.

If secure monitor 120 determines that at least one field in the interrupt enabled/disabled register is masked (or at least one of the DAIF fields in CPU state register is set to 1), secure monitor 120 injects an exception into the system software in a special manner further described below (hereinafter referred to as a "slow upcall"). If secure monitor 120 detects a second high priority interrupt when a first high priority interrupt is being processed, secure monitor 120 can delay handling the second high priority interrupt until secure monitor 120 completes processing the first high priority interrupt. When at least one field in the interrupt enabled/disabled register is masked, it should be recognized that the system software may be processing an interrupt and if the system software is processing an interrupt, executing a fast upcall would overwrite values of exception registers 112 that are needed by the system software upon return from the interrupt handling routine, e.g., exception registers that are storing the CPU state and program counter. Therefore, in executing the slow upcall, secure monitor 120 stores the values of exception registers 112 corresponding to the system software state prior to the secure monitor taking control in a reserved area of host system memory 116, before an exception is injected into the system software. In the example of the ARM64® architecture, the values of ELR, ESR, and SPSR for the exception level ELx are saved in the reserved area of host system memory 116. Then, secure monitor 120 saves ELR_EL3 and SPSR_EL3, which corresponds to the state prior to executing secure monitor 120 in host system memory 116 before injecting the exception, in exception registers 112 for exception level ELx (e.g., in ELR for exception level ELx and SPSR for exception level ELx, respectively), and sets the ELR for exception level EL3 to the value of the vector base address register for exception level ELx plus an offset, and the SPSR for exception level EL3 to indicate the exception level ELx and a stack register selector and to indicate that interrupts are masked. In addition, the ESR for the exception level ELx is set to a value corresponding to the upcall, e.g., SMC. After exception registers 112 are set in the above manner, the system software processes the exception using exception handler 132. After the system software finishes processing the exception injected as part of the slow upcall, the system software restores the values saved in the reserved area of host system memory 116, to exception registers 112, and then resumes processing the previous exception.

As described above, exception handler 132 performs handling of the exception that the system software encounters. As a way to inform exception handler 132 that the exception is the result of an upcall from secure monitor 120 and should be processed differently, secure monitor 120 inserts "SMC" in the exception syndrome register. In addition, if the exception is injected as part of a slow upcall, secure monitor 120 inserts an illegal value, e.g., "EL3" in the field for indicating the exception level ELx in the CPU program state exception register. It should be recognized that EL3 is an illegal value because exceptions return to a more privileged level from a less privileged level.

Upon encountering the exception reason of SMC, exception handler 132 reads the value stored in the CPU program state exception register, and performs exception handling. Then, after handling the exception, exception handler 132 restores the previous execution state of the system software in the standard manner using the return-from-exception instruction (i.e., eret( )) if a valid value is stored in the CPU program state exception register. On the other hand, if an illegal value is stored in the CPU program state exception register, exception handler 132, after handling the exception, executes a downcall into secure monitor 120 to restore the values of values saved in the reserved area of host system memory 116.

An exemplary host computer system 100 that provides the described hierarchical privilege levels includes an ARM®Cortex-A57 (based on the ARMv8 architecture) CPU 114. ARMv8 CPUs, including ARM®Cortex-A57, are commercially available from ARM Holdings of Cambridge, United Kingdom. It should be recognized that the techniques described herein are illustrative rather than restrictive.

It should be recognized that the various terms, layers and categorizations used to describe the virtualization components in FIG. 1 may be referred to differently without departing from their functionality or the spirit or scope of the invention. For example, virtual hardware platforms $142_1$-$142_N$ may be considered to be part of virtual machine monitors (VMM) $140_1$-$140_N$. Alternatively, virtual hardware platforms $142_1$-$142_N$ may be considered to be separate (e.g., as a component of its corresponding virtual machine since such platforms include the hardware emulation components for the virtual machine) from VMMs $140_1$-$140_N$, and VMMs $140_1$-$140_N$ may be considered to be separate from hypervisor 130. One example of hypervisor 130 that may be used is included as a component of VMware® vSphere™, which is commercially available from VMware, Inc. of Palo Alto, Calif. It should further be recognized that other virtualized computer systems are contemplated, such as hosted virtual machine systems, where the hypervisor is implemented in conjunction with a host operating system.

Figure 2:
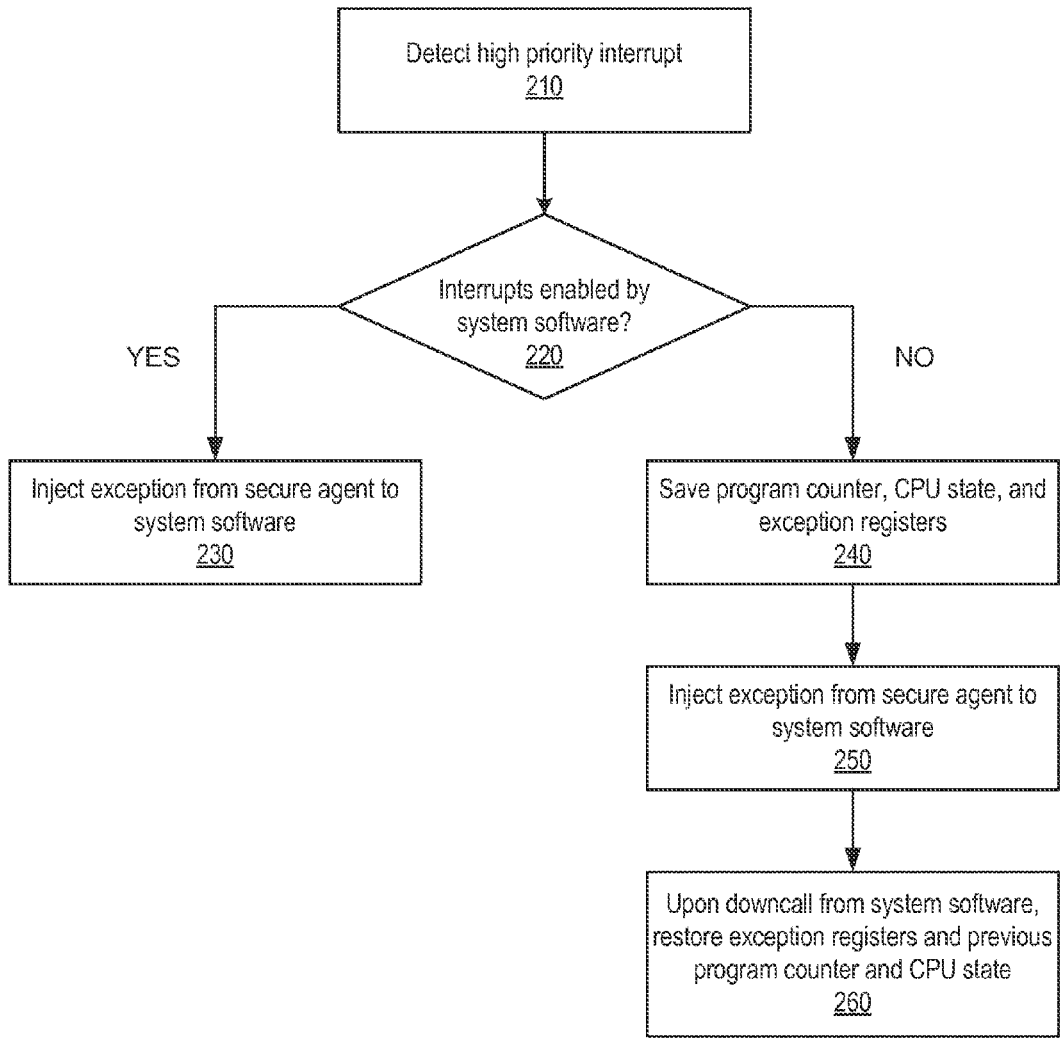
FIG. 2 illustrates a flow diagram of method steps for injecting an NMI-like exception into system software, according to one or more embodiments.

FIG. 2 illustrates a flow diagram of method 200 for executing an upcall into system software, according to an embodiment. In the embodiments illustrated herein, the steps of method 200 are carried out by secure monitor 120 when secure monitor 120 detects a condition on which an NMI should be injected into the system software.

Method 200 begins at step 210, where secure monitor 120 detects a high priority interrupt. A high priority interrupt may correspond to a variety of situations, including hardware failure, a system-specific command (e.g., the Control-Alt-Delete command in Windows and DOS operating systems), and timer-based watchdog functions used to determine, for example, whether system software is stuck in a deadlock situation. Examples of high priority interrupts include those types of interrupts that are NMIs in x86 processor architectures.

At step 220, secure monitor 120 determines whether or not interrupts are enabled. Secure monitor 120 determines whether or not interrupts are enabled by examining a register used to mask different classes of interrupts. If secure monitor 120 determines that interrupts are enabled, secure monitor 120 proceeds to step 230, where secure monitor 120 injects an exception into the system software. In response, the system software handles this exception like a standard exception.

On the other hand, if secure monitor 120 determines that at least some interrupts are disabled, secure monitor 120 executes the slow upcall, beginning at step 240. At step 240, secure monitor 120 saves values of the program counter, CPU state (e.g., the PSR register), and exception registers (e.g., system-level ELR, ESR, and SPSR) that are needed by the system software upon return from the interrupt handling routine into a reserved area of host system memory 116. After step 240, secure monitor 120 at step 250 injects an exception, with the CPU state program register value set to an illegal value to indicate that the exception is a slow upcall from secure monitor 120. In one example, secure monitor 120 indicates that the exception is a slow upcall by setting the SPSR to "EL3." Because EL3 is an illegal value (because exceptions return to a more privileged level from a less privileged level), the system software determines that the exception is not a normal exception, but a slow upcall which requires system software to perform special processing to restore the previously executing code after processing the upcall. Step 260 is carried out some time after step 250, that is, upon receipt of a request from the exception handling routine of the system software to restore the previous state of the exception registers. At step 260, secure monitor 120 restores the saved ELR_ELx, ESR_ELx, and SPSR_ELx from the reserved area of host system memory 116 and simulates the effects of the eret( ) function by restoring ELR_EL3 and SPSR_EL3 from the reserved area of host system memory 116 as well.

Figure 3:
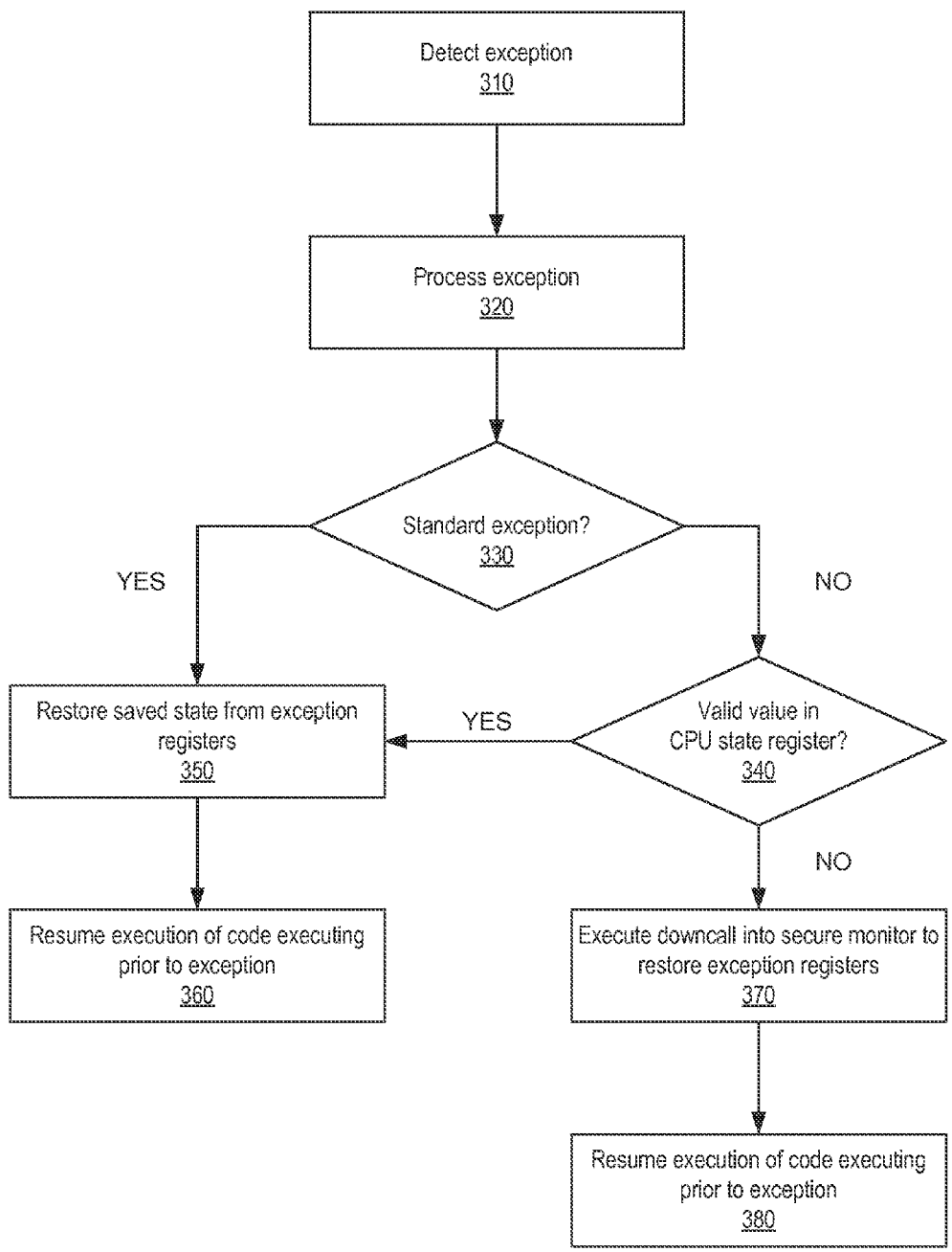
FIG. 3 illustrates a flow diagram of method steps for processing NMI-like exceptions in system software, according to one or more embodiments.

FIG. 3 illustrates a flow diagram of method 300 for processing an upcall, according to an embodiment. In the embodiments illustrated herein, the steps of method 300 is carried out by the system software (e.g., hypervisor 130) when secure monitor 120 injects an exception into the system software.

Method 300 begins at step 310, where the system software encounters an exception. After the system software encounters the exception, the exception handler of the system software processes the exception at step 320 and determines whether a standard or special return should be processed according to decision blocks 330 and 340. If the exception reason is not "SMC" the standard return (steps 350 and 360) is executed. If the exception reason is "SMC" and the CPU program state exception register contains a valid value, the standard return is processed. If the exception reason is "SMC" and the CPU program state exception register contains an illegal value, the special return is processed (steps 370 and 380).

For the standard return, the exception handler restores the saved state of the exception registers 112 at step 350, and then resumes execution according to a return from exception instruction (i.e., eret( )) at step 360.

For the special return, the exception handler executes a downcall into secure monitor 120 at step 370. The downcall requests that secure monitor 120 restore the values of the exception registers stored in the reserved area of host physical memory 116 and resume execution of the code executing before the upcall was injected into system software. After secure monitor 120 restores the values of the exception registers (e.g., SPSR and ELR), secure monitor 120 simulates the behavior of a return from exception instruction (i.e., eret( )) by restoring the previous CPU state and program counter from the reserved area of host physical memory 116. When secure monitor 120 returns from the downcall, system software is executing code at the point it had been at before the slow upcall was injected into system software. The exception registers (e.g., ESR, ELR, and SPSR) reflect the values that were present before the slow upcall was injected into system software.

In the embodiments described above, NMI-like functionality is implemented through upcalls from secure monitor 120 operating at exception level EL3 to hypervisor 130 operating at exception level EL2 or a host operating system operating at exception level EL1. In alternative embodiments, NMI-like functionality may be implemented through upcalls from hypervisor 130 operating at exception level EL2 to a guest operating system in a virtual machine operating at exception level EL1.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A non-transitory computer readable medium comprising instructions to be executed in a computer system operating at multiple privilege levels including a first privilege level and a second privilege level that is lower than the first privilege level, wherein high priority and standard priority interrupts are generated in the computer system, for carrying out a method of handling a high priority interrupt at the first privilege level, said method comprising:
   detecting a high priority interrupt;
   determining whether or not interrupts are enabled or disabled;
   if the interrupts are enabled, injecting an exception into a currently executing thread of system software operating at the second privilege level; and
   if the interrupts are disabled, saving current system state and values of one or more exception handling registers in temporary storage and injecting an exception into the currently executing thread of the system software.

2. The non-transitory computer readable medium of claim 1, wherein the exception injected into the currently executing thread of the system software includes an exception reason field indicating a secure monitor call.

3. The non-transitory computer readable medium of claim 2, wherein an illegal value is stored in the one or more exception handling registers.

4. The non-transitory computer readable medium of claim 3, wherein the illegal value represents the first privilege level.

5. The non-transitory computer readable medium of claim 1, wherein the saving of current system state comprises:
   saving program state information and return pointer.

6. The non-transitory computer readable medium of claim 5, wherein the method further comprises:
   receiving a request to restore the saved program state information and return pointer; and
   restoring the saved program state information and return pointer.

7. The non-transitory computer readable medium of claim 1, wherein the system software is a hypervisor.

8. In a computer system operating at multiple privilege levels including a first privilege level and a second privilege level that is lower than the first privilege level, wherein high priority and standard priority interrupts are generated in the computer system, a method of handling a high priority interrupt at the first privilege level, said method comprising:
   detecting a high priority interrupt;
   determining whether or not interrupts are enabled or disabled;
   if the interrupts are enabled, injecting an exception into a currently executing thread of system software operating at the second privilege level; and
   if the interrupts are disabled, saving current system state and values of one or more exception handling registers in temporary storage and injecting an exception into the currently executing thread of the system software.

9. The method of claim 8, wherein the exception injected into the currently executing thread of the system software includes an exception reason field indicating a secure monitor call.

10. The method of claim 9, wherein an illegal value is stored in the one or more exception handling registers.

11. The method of claim 10, wherein the illegal value represents the first privilege level.

12. The method of claim 8, wherein the saving of current system state comprises:
   saving program state information and return pointer.

13. The method of claim 12, further comprising:
   receiving a request to restore the saved program state information and return pointer; and
   restoring the saved program state information and return pointer.

14. The method of claim 8, wherein the system software is a hypervisor.

15. A computer system operating at multiple privilege levels including a first privilege level and a second privilege level that is lower than the first privilege level, wherein high priority and standard priority interrupts are generated in the computer system, the computer system comprising:
   one or more processors;
   exception handling registers; and
   host physical memory having installed therein virtualization software for carrying out a method of handling a high priority interrupt at the first privilege level that includes the steps of:
   detecting a high priority interrupt;
   determining whether or not interrupts are enabled or disabled;
   if the interrupts are enabled, injecting an exception into a currently executing thread of system software operating at the second privilege level; and
   if the interrupts are disabled, saving current system state and values of one or more exception handling registers in temporary storage and injecting an exception into the currently executing thread of the system software.

16. The computer system of claim 15, wherein the exception injected into the currently executing thread of the system software includes an exception reason field indicating a secure monitor call.

17. The computer system of claim 16, wherein the value stored in one of the exception handling registers is an illegal value.

18. The computer system of claim 17, wherein the illegal value represents the first privilege level.

19. The computer system of claim 15, wherein the saving of current system state comprises:
   saving program state information and return pointer.

20. The computer system of claim 19, wherein the method further comprises the steps of:
   receiving a request to restore the saved program state information and return pointer; and
   restoring the saved program state information and return pointer.

* * * * *